Oct. 15, 1957 F. D. STOOPS 2,809,820
LOW PRESSURE DROP LIQUID-VAPOR CONTACTING TRAY
Filed Dec. 7, 1953 3 Sheets-Sheet 1

INVENTOR.
F. D. STOOPS
BY *Hudson & Young*
ATTORNEYS

INVENTOR.
F. D. STOOPS

Oct. 15, 1957 F. D. STOOPS 2,809,820
LOW PRESSURE DROP LIQUID-VAPOR CONTACTING TRAY
Filed Dec. 7, 1953 3 Sheets-Sheet 3

INVENTOR.
F. D. STOOPS
BY
ATTORNEYS

2,809,820

LOW PRESSURE DROP LIQUID-VAPOR CONTACTING TRAY

Forrest D. Stoops, Bartlesville, Okla., assignor to Phillips Petroleum Company, a corporation of Delaware Application December 7, 1953, Serial No. 396,658

3 Claims. (Cl. 261—106)

This invention relates to vapor-liquid contacting apparatus. In one aspect it relates to vapor-liquid contacting apparatus for use in such contacting operations as fractional distillation, absorption, stripping, and such chemical treaters as dehydrators involving use of a liquid dehydrating agent, amine treaters for acidic gas removal and the like.

The contacting apparatus of my invention is applicable for use in substantially any applications wherein it is desired to accomplish intimate contacting between vapor and liquid.

An object of my invention is to devise a vapor-liquid contacting apparatus which is operated with a minimum of pressure drop through the contacting vessel.

Another object of my invention is to provide a vapor liquid contacting apparatus which assures positive contact between vapor and liquid at all times.

Still another object of my invention is to devise a vapor-liquid contacting apparatus in which the inadvertent upward flow of entrained liquid with vapor is reduced to a minimum.

Yet another object of my invention is to provide a vapor-liquid contacting apparatus which does not exhibit surging of liquids on a contacting tray.

Still other objects and advantages of my invention will be realized upon reading the following description and drawing, which respectively describes and illustrates preferred embodiments of my invention.

In the drawing, Figure 1 is an elevational view, partly in section, of one embodiment of apparatus of my invention.

Figure 1:
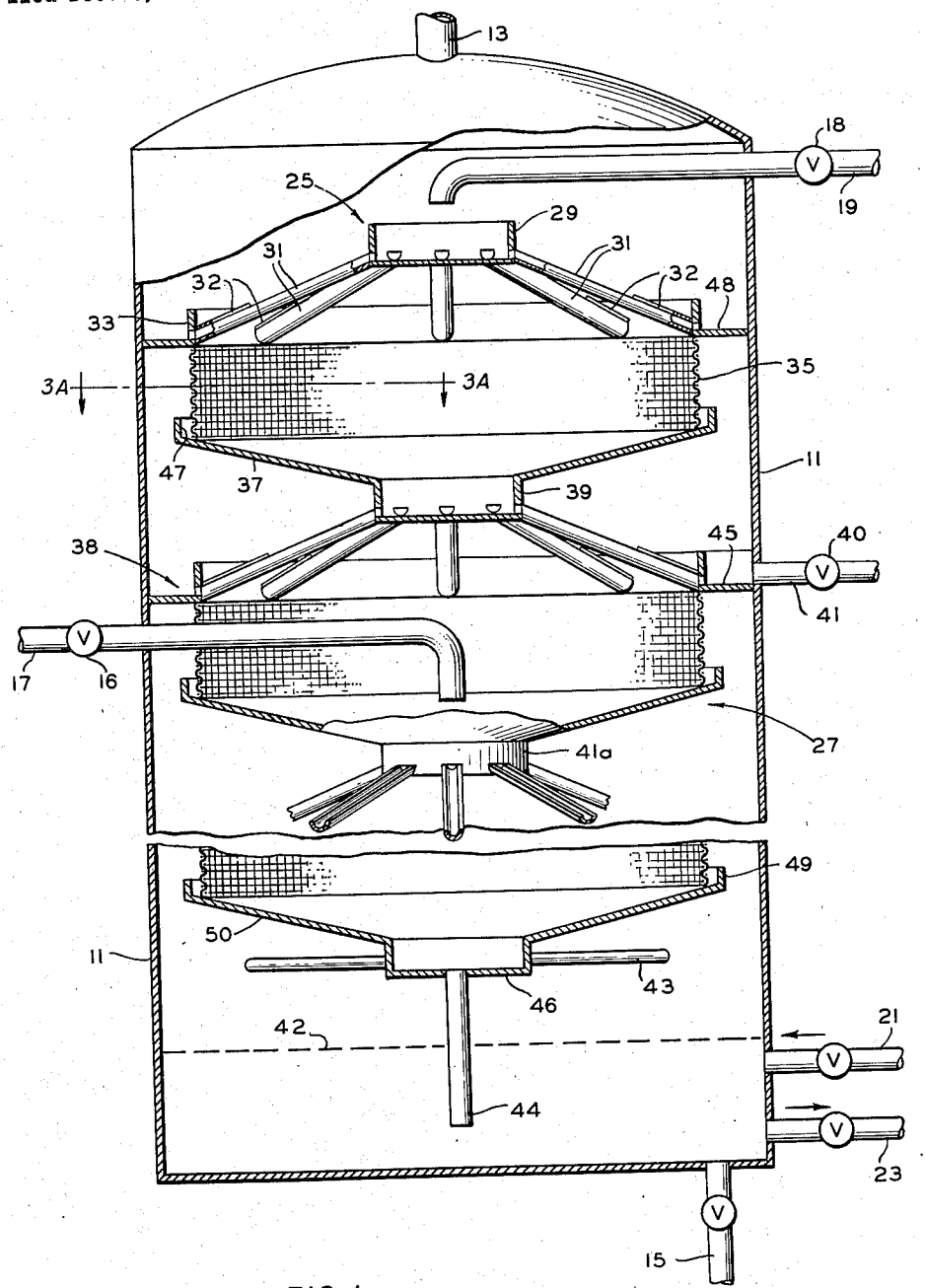

Referring now to the drawing and specifically to Figure 1, reference numeral 11 identifies a generally cylindrical vertically disposed contacting vessel. This vessel is equipped with an overhead vapor product withdrawal line 13 and a bottoms product withdrawal line 15. A pipe 19 is provided at a point near the top of the column and carrying a valve 18 for inlet of liquid at the top of the column. A pipe 17 carrying a valve 16 is provided at an intermediate point of the column for inlet of materials undergoing treatment. A pipe 41 with a valve 40 is also provided at an intermediate point of the column but at a level above the level of line 17 for withdrawal of a side product in case the vapor-liquid contacting is one of fractional distillation.

In the upper section of the column is provided a reflux distributor assembly 25 for use in conjunction with the valved pipe 19 when the column is being used as a fractional distillation column or as a fractional stripper. This reflux distributor assembly comprises an open top pan 29 disposed directly under the outlet end of pipe 19. To the lower edge of the pan 19 is attached, preferably, a plurality of distributor downspouts 31 leading to a weir 33. The downspouts 31 can be tubes or pipes, or, open-top spouts or troughs if they are attached to the upper edge of the weir 33. As shown in Figure 1 these downspouts have liquid-tight covers over their lower ends so that liquid flowing from pan 29 to weir 33 will not overflow from the lower ends of the downspouts. These downspouts 31 are preferably equally distributed throughout the circumference of the weir and distributor pan for equal distribution of liquid from the pan to the weir. Attached to the weir and hanging downward therefrom is a perforate cylinder member such as a screen 35 or a perforate plate having a large ratio of perforations. This screen or perforate plate is disposed with respect to the weir in such a manner that when liquid overflows the weir it flows downward over the screen in such a manner as to provide a large surface for contacting with vapor. Directly below this screen 35 is a liquid collecting tray 37. This liquid collecting tray is an annular element with an opening in the middle into which fits a next lower open top pan 39. The outer circumference of this collecting tray 37 extends a short distance beyond the hanging screen in such a manner that the collecting tray is positive in its action in collecting all the downflowing liquid. If desired and it is preferable to provide a short baffle plate 47 surrounding the outer edge of this collecting tray to assist the tray in collecting the downflowing liquid. The bottom plate element 48 of the weir 33 serves a dual purpose. First, it forms the bottom of the weir and second its underside serves as a vapor deflector which causes vapor flowing upward between the collecting tray and the wall of the vessel to turn at right angles and pass through the screen 35 with its curtain of downflowing liquid. This type of operation is positive in its action and since the upper edge of the weir is level there is an even distribution of liquid flowing over the weir at all times.

The liquid collecting in collecting tray 37 flows into the next lower open top pan 39 from which the liquid is distributed to a next lower weir assembly 38. I have illustrated in Figure 1, a small sump or trap 45 to which the valved pipe 41 is connected for removal of an intermediate side product when desired. Liquid not removed as side product overflows this weir in the same manner as that described above in relation to weir 33. The liquid which is collected by a collecting tray 27 flows into still another open top pan 41.

Liquid or liquid and vapor feedstocks undergoing fractionation is introduced into the column through pipe 17 and this feed material is added to the liquid collected by tray 27 and the combined liquids are distributed by another set of downcomer pipes to a still lower weir for treating at lower levels of the vessel. Any given number of contacting steps can be provided below the feed level as desired. The lower packing apparatus of this vessel comprises a lowermost liquid collecting tray 50, a vapor deflector 49, and an open top pan 46 and a downspout 44. This downspout 44 leads from the pan 46 to a point near the bottom of the vessel and the lower end of pipe 44 is intended to be below the surface of liquid in this vessel at all times so that vapor cannot flow up the tube thereby by-passing the lowest contacting stage in the column. A lake of liquid in this column is identified by reference numeral 42. The open top pan 46 is illustrated as being supported by a plurality of support rods 43 extending from the pan to the walls of the vessel. If desired all of the pans 29, 39, 41a and 46 are supported by such support rods or if desired, the pans and their downspouts or pipes can be fully supported by the weir assemblies which are rigidly attached to the side walls of the vessel. The weir assemblies, of course, support the screens or perforate plate vapor liquid contacting elements. In case the column is used in a fractional distillation operation or in an operation in which a dissolved gaseous or vaporous material is stripped from a liquid, a heating medium such as steam is introduced into the column through a valved pipe 21. In case a portion of the liquid in the bottom of the column is desired to be used as heating medium that part so required is removed through a valved line 23 passing through a heater and reintroduced into the column through the valved pipe 21.

In case the apparatus of Figure 1 is used in an absorption operation, for example, in the absorption of condensable hydrocarbon constituents from a natural or refinery gas, by an absorbent oil, the absorbent oil is introduced into the column through the valved pipe 19 and the gas undergoing absorption is introduced into the column either through pipe 21 or pipe 23 while the gases stripped of their soluble constituents are removed through the overhead vapor outlet line 13 and the rich absorbent is removed through the valved pipe 15.

In case the column is used in a stripping operation in which a dissolved gas or a vaporous material is desired to be removed from a solvent the rich solvent is introduced into the column through line 19 and the liquid passes downward in countercurrent relation to upflowing stripping gas, such as steam, inert vapors or such other gas as desired. The stripping gas is introduced into the column through line 21 or line 23 and the lean absorbent is removed through the bottom product outlet line 15. In this case, obviously, valve 40 and the side draw line 41 and the valve 16 in line 17 are closed.

Figure 2A:
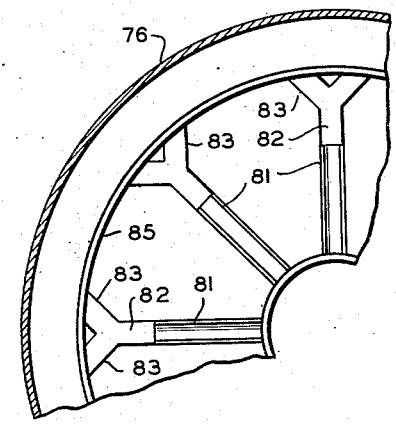
Figures 2A, 2B, 2C and 2D illustrate several embodiments of an apparatus part of my invention.

Figures 2A, 2B, 2C and 2D illustrate several different types of downspouts and weirs. In Figure 2A each assembly of a downspout 81 and branched spouts 83 is provided with a cover plate 82. The branched tubes 83 assist in distribution of downflowing liquid to the weir. Reference numeral 85 refers to the actual weir over which the liquid must flow in order to pass to the next vapor-liquid contacting screen.

Figure 2B:
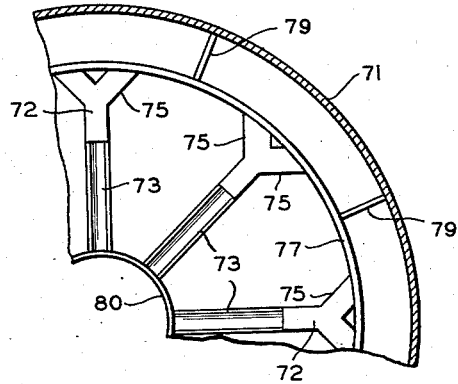
Figure 2C:
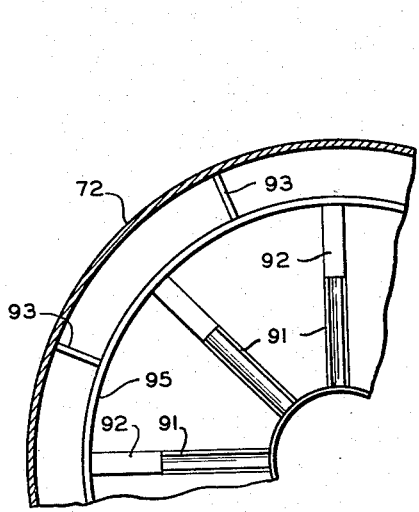
Figure 2D:
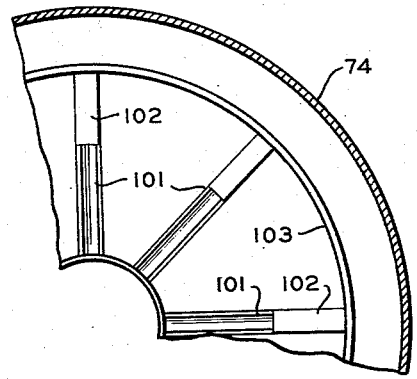

In Figure 2B downspouts 73 are provided with the same general type of distributor pipes 75 and cover plates 72 as illustrated in the embodiment of Figure 2A but the weir trough is provided with dividing baffles 79. These baffles or plates are intended to eliminate circumferential flow of liquid in case the weir surface 77 is out of level. In the embodiment of Figure 2C is illustrated simple downspouts 91 with cover plates 92 and the weir assembly is provided with partition plates 93 similar to those mentioned relative to embodiment 2B. Embodiment 2D has simple downspouts 101 and coverplates 102 and is similar to embodiment 2A in that the weir assembly does not contain any of the baffle plates.

Figure 3A:
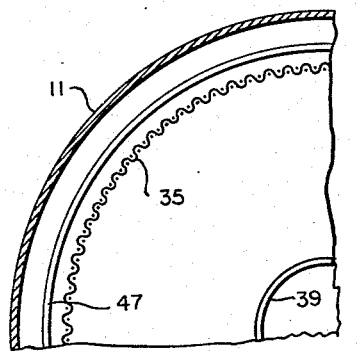
Figure 3A is a section of a portion of Figure 1 taken along the line 3A.
Figure 3B:
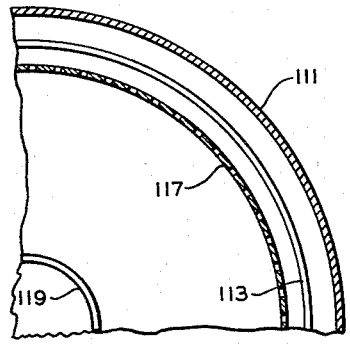
Figure 3B is a section similar to that illustrated in Figure 3A but illustrating another embodiment of perforate curtain.

Figures 3A and 3B are plan views, in section, illustrating embodiments of perforated contacting elements. Figure 3A illustrates a woven wire screen 35 which in this case is the cylindrical contacting element identified by reference numeral 35 of Figure 1. The vessel wall 11, a vapor guide baffle 47 and a distributor pan 39 are shown in part. In the embodiment of Figure 3B is shown a punched plate 117 vapor-liquid contacting element which when installed in the column of Figure 1 would replace the screen 35. In Figure 3B the walls of the column are also identified by reference numeral 11, while reference numeral 47 also identifies the outlet circumference of the vapor baffle of the collecting tray. Reference numeral 39 also refers to the open top distributing pan.

Figure 4A:
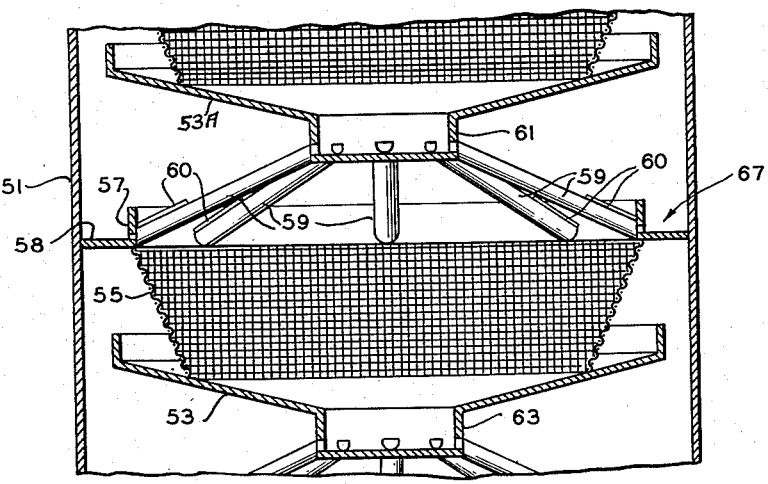
Figures 4A and 4B are elevational views illustrating several embodiments of apparatus parts of my invention.
Figure 4B:
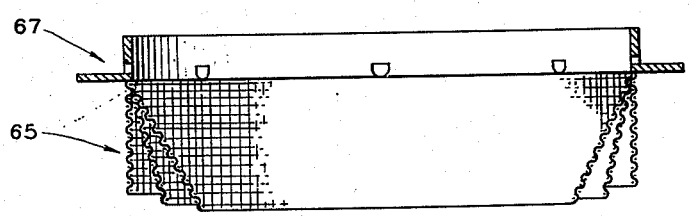

In Figure 4A is illustrated one arrangement of contacting screen. In Figure 4A reference numeral 51 identifies the wall of the vessel in which the contacting equipment is assembled. To the wall 51 is attached an annular plate 58 which serves as a vapor deflector and as the bottom of a weir assembly 67. A weir element 57 is attached to the inner circumference of this annular plate 58 as illustrated. A liquid collecting tray 53A with its centrally disposed open top pan 61 is shown. To the pans are attached a plurality of downspouts 59, each downspout being provided with a cover plate 60. These downspouts 59 lead from pan 61 to the weir assembly 67. Liquid overflows the weir 57 and flows downward following a sloping screen element 55 or as illustrated in the embodiment of Figure 4B, a plurality of screen elements identified by reference numeral 65. Vapor rising from down below flows upward through the annulus between a liquid collecting tray 53 and a wall of vessel 51 and is deflected by the bottom of the weir 58 and this vapor flows through the screen 55 or through the screen assembly 65 to contact the downflowing liquid. Downflowing liquid, of course, is collected by a collector tray 53 and from this tray the liquid flows into the next lower open top pan 63.

I find that when using this apparatus of my invention a very efficient contacting of generally upflowing vapor with generally downflowing liquid is achieved. Since upflowing vapor is diverted by the bottom of each weir assembly inwardly toward the center of the tower this vapor is positively driven through a sheet or curtain of downflowing liquid thereby giving positive contact between vapor and liquid. Vapor from all portions of the circumferential contacting screen obviously flows toward the center of the column and the vapor is then reversed in direction and passes outward in the general upward direction of the next higher annular space between the next higher collecting tray and the walls of the vessel. This change in direction that the vapor experiences assists in throwing out liquid droplets and mist on the downspout elements, on the underside of the open top pans and on the bottom side of the annular collecting trays. In addition when the vapors rise upward through the annular spaces between the periphery of a liquid collecting tray and the walls of the vessel and is abruptly redirected toward the center of the vessel through the contacting screen, this change of direction also assists in mist and droplet removal. All liquid so removed from the vapor in the annulus between the periphery of a collecting tray and the wall of the vessel flows downward along the walls of the vessel and is ultimately caught in a weir assembly. Any liquid impinging against the downspouts, the underside of the open top pans and the underside of the collecting trays flows downward and ultimately drops into the next lower collecting tray into which the liquid would have been received if it had not been entrained by the vapors. By this manner of operation, there is only a minimum of liquid carry-up from one tray to a next higher tray with a resultant minimum of contamination of liquid on one tray by liquid from a lower tray. In the fracionation of hydrocarbon fractions such contamination would mean that high end point material from one tray is carried upward to a next higher tray. In a conventional bubble cap column, liquid entrained in a vapor flows directly upward from one tray through the bubble cap chimney in the next higher tray. As soon as the fluid leaves the chimney it impinges against the underside of a bubble cap, the liquid adheres to the bubble cap while the vapor passes on and through the cap slots for contacting of liquid on that tray. The liquid which impinges against the underside of the cap drains into the liquid on that tray giving the above mentioned contamination of liquid on one tray by liquid on a next lower tray.

My arrangement of collecting pans, the downspout conduits and the weir assemblies around the periphery of the vessel with the uniform overflowing of the liquid eliminates imperfect fractionation which sometimes results during liquid surging across bubble cap trays. At times when the bubble cap trays are called upon to carry an abnormally high vapor load, vapor sometimes literally blows through bubble cap entraining all liquid from one portion of the tray while the liquid is abnormally deep on another portion of the tray. In a case of this nature, at least, a portion of the vapor passes through the tray without being contacted by the liquid on that tray.

In my column, liquid from the collecting tray flows into the open top pans for distribution to a next lower weir and the liquid on being distributed to the several downspout tubes is free from disturbance by generally upflowing gases and in this manner liquid distribution to and from a weir is in general free from interruption by vapor flow.

Under conditions when it is desired to use a perforated plate or a perforated frusto-conical section of a perforated plate as the vapor-liquid contacting element, the ratios of perforations should be as high as possible to eliminate or to minimize pressure drop through the column and to increase as much as possible surface carrying downflowing liquid for contact with vapor. As illustrated in Figure 4B, I have shown a plurality of screens or perforate plates for providing an abnormally large surface for vapor-liquid contacting. The screens of punched plates can as herein described be disposed vertically or sloping at any angle desired. The angle of slope, however, should be sufficiently small that at least the major portion of a downflowing liquid flows down the plate or screen in place of dropping therefrom since droplets of liquid expose a minimum of surface in contrast to a maximum of liquid surface which would be presented by a thin layer of liquid flowing down in a screen or plate.

While I have described the liquid vapor contacting apparatus of my invention as being adapted for use in a cylindrical vapor liquid contacting vessel it is also used in contacting vessels of square and rectangular cross-sections as well as in vessels having other forms of cross-sections. For example, in the column of rectangular cross-section the weir assemblies are placed one above another throughout the vertical length of one wall while the pans are placed along the vertical wall opposite the weir assemblies with the collecting pans extending from each perforate curtain across the vessel to the next lower pan. Then from each pan the conduits or troughs also extend across the vessel to the next lower weir assembly.

Another embodiment of my invention is a vapor liquid contacting vessel of rectangular cross-section involving weir assemblies on opposite walls of the vessel while pans are disposed across the vessel and being supported in any manner desired as for example by the other two opposite walls of the vessel. In this case the axes of the pans are parallel to the axes of the weir assemblies. In this case collecting trays extend from perforate curtains below a pair of corresponding weirs to a centrally disposed next lower pan. Conduits or troughs extend from said pan in the direction of the first mentioned opposite walls and connect the pan with the next lower pair of weir assemblies.

The apparatus parts of my invention may be made from materials generally available in commerce such as iron, steel, Monel, copper, stainless steel or such other materials as would be necessary to resist corrosion of material undergoing treatment. The weight of this packing apparatus of my invention, for example, a fractionating column of a given diameter and a given number of trays, is considerably less than the weight of bubble cap-trays in the same size column.

While certain embodiments of the invention have been described for illustrative purposes, the invention obviously is not limited thereto.

I claim:

1. A vapor-liquid contacting device comprising, in combination, an elongated, generally cylindrical and vertically disposed vessel having imperforate walls, a plurality of centrally positioned open top pans mounted in said vessel at spaced levels, a separate weir assembly disposed circumferentially around the inner surface of said wall of said vessel intermediate successive pairs of said pans, a separate gently upward sloping conduit means connecting each weir with the pan next higher up the vessel, each weir assembly being so positioned with respect to the pan next higher as to obtain gravity flow from each pan to the next lower weir assembly, said weir assemblies being disposed in such a manner as to discharge a substantially uniform flow of liquid thereover throughout their entire circumferences, a separate perforate curtain depending from the entire circumference of each weir, a separate annular liquid receiving tray disposed below each of said curtains and above a next lower pan in such a manner as to collect liquid overflowing said weirs, the outer diameter of each annular liquid receiving tray being less than the inner diameter of said vessel to provide an annular space therebetween for vapor flow, each of said annular liquid receiving trays having a centrally located opening, the inner circular edge of each of said annular liquid receiving trays benig disposed fluid-tight around the upper open end of said next lower pans in such a manner that liquid collected on a collecting tray flows by gravity into said next lower pan, a first conduit extending from the lowermost pan to a level adjacent the bottom of said vessel, a second conduit for introducing liquid from outside said vessel to a pan, means to supply vapor to the portion of said vessel generally below the lowermost weir and outside its depending perforate curtain, and third and fourth conduits to remove respectively vapor from the top and liquid from the bottom of said vessel.

2. The apparatus of claim 1 wherein the separate perforate curtains are frusto-conical curtains.

3. The apparatus of claim 1 wherein the separate perforate curtains are cylindrical curtains.

References Cited in the file of this patent

UNITED STATES PATENTS

| | | |
|---|---|---|
| 723,098 | White | Mar. 17, 1903 |
| 989,697 | Cutler | Apr. 18, 1911 |
| 1,248,112 | Helander | Nov. 27, 1917 |
| 1,782,862 | Wagner | Nov. 25, 1930 |
| 1,850,930 | Heid | Mar. 22, 1932 |
| 2,206,507 | Kuhni | July 2, 1940 |
| 2,430,333 | Hadden | Nov. 4, 1947 |
| 2,550,679 | Engel et al. | May 1, 1951 |
| 2,570,215 | Dice | Oct. 9, 1951 |
| 2,639,905 | Dow | May 26, 1953 |
| 2,651,512 | Voleau | Sept. 8, 1953 |

FOREIGN PATENTS

| | | |
|---|---|---|
| 37,593 | Germany | Nov. 10, 1886 |